United States Patent
Liu

(10) Patent No.: US 7,580,026 B2
(45) Date of Patent: Aug. 25, 2009

(54) THIN FILM TRANSISTOR ARRAY SUBSTRATE AND ELECTRONIC INK DISPLAY DEVICE

(75) Inventor: Chuan-Feng Liu, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 582 days.

(21) Appl. No.: 11/484,967

(22) Filed: Jul. 12, 2006

(65) Prior Publication Data

US 2007/0200813 A1 Aug. 30, 2007

(30) Foreign Application Priority Data

Feb. 24, 2006 (TW) ............... 95106245 A

(51) Int. Cl.
G09G 3/00 (2006.01)
G09G 3/34 (2006.01)

(52) U.S. Cl. ............... 345/107; 345/55; 345/90; 345/92

(58) Field of Classification Search ........... 345/55–107, 345/694–698
See application file for complete search history.

(56) References Cited

U.S. PATENT DOCUMENTS

| | | | | |
|---|---|---|---|---|
| 6,414,665 B2* | 7/2002 | Libsch et al. | | 345/92 |
| 6,781,567 B2* | 8/2004 | Kimura | | 345/92 |
| 6,987,503 B2* | 1/2006 | Inoue | | 345/107 |
| 7,116,303 B2* | 10/2006 | Park | | 345/92 |
| 7,298,354 B2* | 11/2007 | Yang | | 345/92 |
| 7,397,453 B2* | 7/2008 | Park | | 345/92 |
| 2004/0119671 A1* | 6/2004 | Kim et al. | | 345/87 |
| 2006/0061533 A1* | 3/2006 | Johnson et al. | | 345/92 |
| 2007/0146275 A1* | 6/2007 | Choi | | 345/92 |
| 2008/0094322 A1* | 4/2008 | Sarma et al. | | 345/107 |

FOREIGN PATENT DOCUMENTS

| | | |
|---|---|---|
| CN | 1089366 | 7/1994 |
| CN | 1262530 | 8/2000 |
| WO | 20040212753 A1 | 10/2004 |

* cited by examiner

Primary Examiner—David L Lewis
(74) Attorney, Agent, or Firm—Sheehan Phinney Bass & Green P.A.; Peter A. Nieves

(57) ABSTRACT

A thin film transistor array substrate and an electronic ink display device are provided. The thin film transistor includes a substrate, scan lines, data lines, thin film transistors, and pixel electrodes. The substrate has plural pixel regions, and the scan lines and the data lines are disposed on the substrate. Additionally, each pixel region has at least two thin film transistors therein, each thin film transistor only corresponds to one scan line and one data line, and each scan line and each data line is corresponded to at least one thin film transistor respectively. Furthermore, each pixel region has a pixel electrode therein, and the pixel electrode covers and is electrically connected to the thin film transistors in the same pixel region. The thin film transistor array substrate and the electronic ink display device can provide superior repairing functions to pixel defects for improving productive yield.

14 Claims, 6 Drawing Sheets

THIN FILM TRANSISTOR ARRAY SUBSTRATE AND ELECTRONIC INK DISPLAY DEVICE

RELATED APPLICATIONS

The present application is based on, and claims priority from, Taiwan Application Serial Number 95106245, filed Feb. 24, 2006, the disclosure of which is hereby incorporated by reference herein in its entirety.

BACKGROUND OF THE INVENTION

1. Field of Invention

The present invention relates to an active device array substrate and a display device. More particularly, the present invention relates to a thin film transistor array substrate and an E-ink display device.

2. Description of Related Art

E-ink display device was initially developed in 1970's. It is featured by a charged small ball with white color on one side and black color on the other side. The charged small ball rotates up and down to show different colors when the electrical field applied to small ball is changed. The second generation E-ink display device, developed in 1990's, is featured by a microcapsule which substitutes the conventional charged ball. The microcapsule is filled by color oil and charged white particles. By varying external electrical field allows white particles to move up or down. White color will be illustrated when white particles are moving up (getting close to reader) and the color of oil will be illustrated when white particles are moving down (getting away from reader).

In general, commercial E-ink display device comprises a front plane laminate (FPL) and a thin film transistor array substrate. Front plane laminate usually comprises a transparent cover, a transparent electrode layer and an E-ink material layer. The E-ink material layer comprises E-ink and supporting liquid. When the electrical field between each pixel electrode of the thin film transistor array substrate and the transparent cover of the front plane laminate is changed, E-ink will flow up or down to change optical property of each pixel.

Problems such as broken circuit and short circuit caused by contaminated particles and unexpected residual material are possible in manufacturing process which lead to low quality E-ink display device with dot defect or line defect. Therefore, it is very necessary to avoid such problem in order to improve the quality of E-ink display device.

SUMMARY OF THE INVENTION

An aspect of the present invention is to provide a thin film transistor array substrate which overcome conventional problems and improve yield rate.

In accordance with the foregoing and another aspects of the present invention, an E-ink display device utilizing the thin film transistor substrate mentioned above is provided to avoid conventional problem and improve quality.

In accordance with the foregoing and other aspects of the present invention, a thin film transistor array substrate is used in an E-ink display device. The thin film transistor array substrate of the invention comprises a substrate, a plurality of scan lines and a plurality of data lines, a plurality of thin film transistors and a plurality of pixel electrodes. Wherein, the substrate also comprises a plurality of pixel areas formed thereon. Moreover, al least two thin film transistors are formed in each pixel area. Each of the thin film transistors only corresponds to one scan line and data line. Each of the scan line and data line, at least, corresponds to one thin film transistor. One pixel electrode is formed in each pixel area. The pixel electrode covers and connects to the thin film transistor in the same pixel area.

According to a preferred embodiment, each pixel area contains, at least, two thin film transistors corresponding to two scan lines. The thin film transistor array substrate can further comprise a plurality of connecting lines formed in the pixel area to connect scan lines in the same pixel area.

According to a preferred embodiment, each pixel area contains four thin film transistors corresponding to two scan lines and two data lines. Moreover, the thin film transistor array substrate of the invention can further comprise a plurality of connecting lines formed in the pixel area to connect scan lines or data lines in the same pixel area.

This invention provides an E-ink display device comprising the thin film transistor array substrate, an E-ink material layer, a transparent electrode layer and a transparent cover, wherein the E-ink material layer is formed on the pixel electrodes of the E-ink transistor array substrate and the transparent cover is formed on the E-ink material layer. Furthermore, the transparent electrode layer is formed between the transparent cover and the E-ink material layer.

Accordingly, several thin film transistors are formed in one pixel area. Once if any defect is found, the pixel repairing technique can be used to fix the problem or even an automatic recovery, the damaged thin film transistor can be substituted by the spare one, can be performed without using the pixel repairing technique. Furthermore, the E-ink display device featured by its displaying property allows the pixel area to be completely covered by pixel electrode, so to increase the number of thin film transistor or circuit below the pixel electrode doesn't change the aperture ratio of the pixel.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
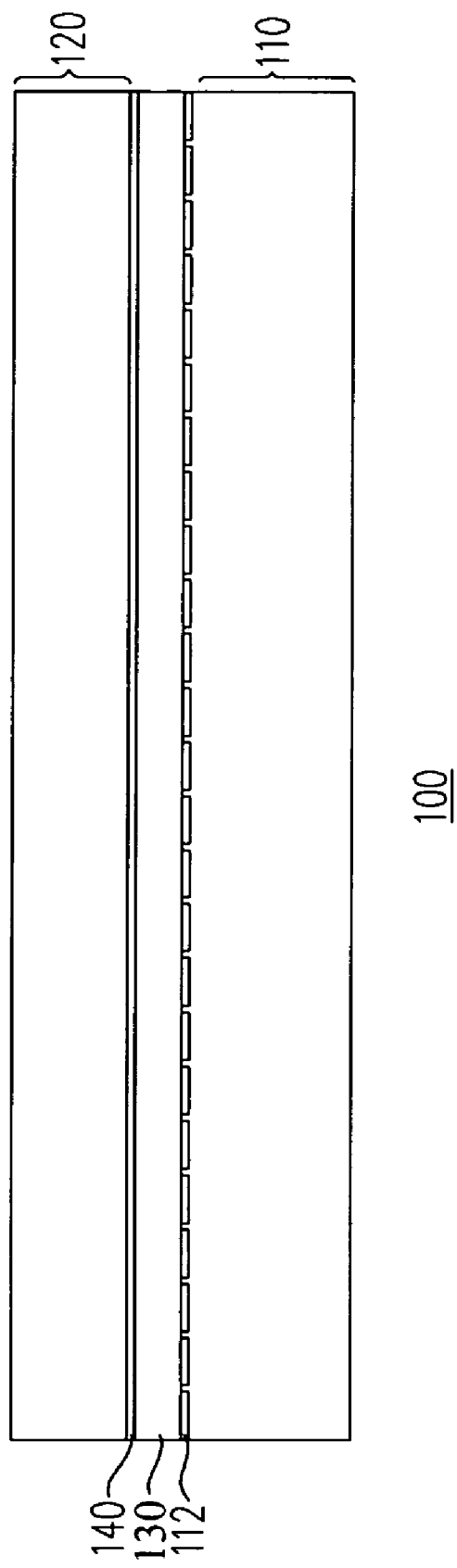
FIG. 1 is a cross-sectional view of an E-ink display device of this invention.

Please refer to FIG. 1, FIG. 1 is a cross-sectional view of an E-ink display device of this invention, E-ink display device 100 comprises a thin film transistor array substrate 110, a transparent cover 120, an E-ink material layer 130 and a transparent electrode layer 140. The material used in the transparent cover 120 is, for example, polyethylene terephthalate (PET) or other types of plastic material. The transparent electrode layer 140 made of indium zinc oxide (IZO) or other transparent conducting materials is formed on the transparent cover 120. The E-ink material layer 130 is formed between the transparent electrode layer 140 and the pixel electrode 112 of the thin film transistor array substrate 110. The optical property of each pixel in the E-ink display device may be modified by changing the electric field between the pixel electrode 112 and the transparent electrode layer 140

The solution provided by this invention to solve defect problem is to form more than two thin film transistors in one pixel area so the yield rate can be increased. The layout and pixel structure of thin film transistor in this invention will be disclosed and several preferred embodiments is also discussed.

Figure 2:
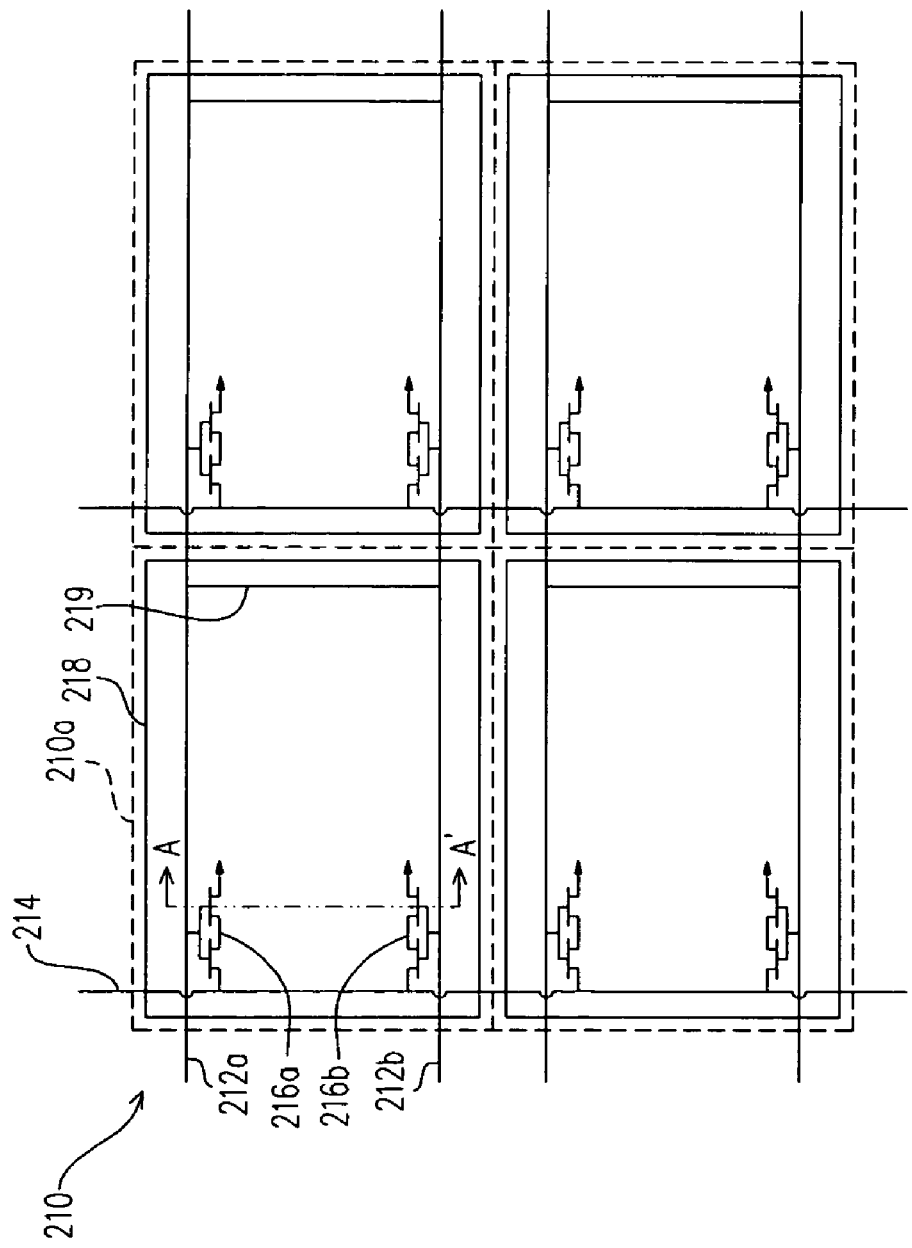
FIG. 2 is a layout of thin film transistor array substrate of this invention, according to one preferred embodiment of this invention.
Figure 3:
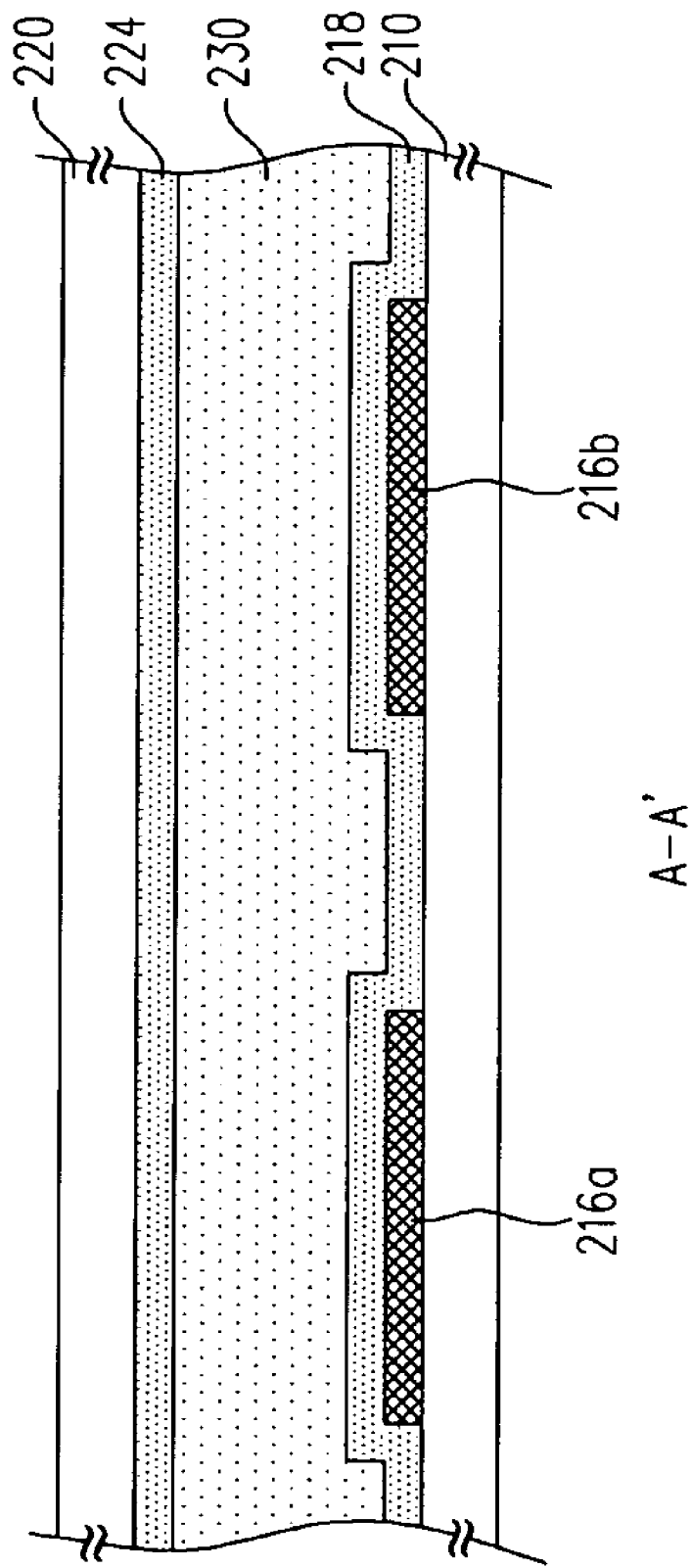
FIG. 3 is a cross-sectional view along A-A' in FIG. 2.

Please refer to FIG. 2 and FIG. 3, FIG. 2 is a layout of thin film transistor array substrate of this invention, according to one preferred embodiment of this invention, and FIG. 3 is a cross-sectional view along A-A' in FIG. 2. Referred is made to FIG. 2, a plurality of scan lines 212a, 212b and a plurality of data lines 214 are formed on substrate 210. The substrate 210 is divided into several pixel areas 210a containing a first scan line 212a, a second scan line 212b and a data line 214 passing through every pixel area 210a.

A first thin film transistor 216a and a second thin film transistor 216b are formed on every pixel area 210a. The first thin film transistor 216a is triggered by the first scan line 212a, the second thin film transistor 216b is triggered by the second scan line 212b. In this preferred embodiment, The first thin film transistor 216a and the second thin film transistor 216b are, for example, dual gate thin film transistors with minimum leakage current between source and drain so transistors 216a, 216b with good electric property can be expected. However, the first thin film transistor 216a and the second thin film transistor 216b may be other types of thin film transistors (for example, single gate thin film transistor) in other preferred embodiments.

Please refer to FIG. 2 and FIG. 3, a pixel electrode 218 is formed on every pixel area 210a and connected downward to the first thin film transistor 216a and the second thin film transistor 216b.

The pixel area 210a including the first thin film transistor 216a and the second thin film transistor 216b is completely covered by the pixel electrode 218, so the aperture ratio of the pixel will not be influenced by the number of thin film transistor or circuit. In this preferred embodiment, the pixel electrode can be made of transparent conducting material or metallic material such as indium tin oxide (ITO) and indium zinc (IZO).

When the thin film transistor array substrate mentioned above is in operation. For example, same driving signal is transmitted to the first scan line 212a and the second scan line 212b in the same pixel to activate their corresponded first thin film transistor 216a and second thin film transistor 216b, respectively. A displaying voltage from the data line 214 is then input into the pixel electrode 218 connected to transistors 216a, 216b through the data line, the first thin film transistor 216a and the second thin film transistor 216b. Pigment of the E-ink material layer 230 is able to move in the direction of electric field between the pixel electrode 218 and the transparent electrode layer 240 of the transparent cover 220. Therefore, colors can be displayed in each pixel of the E-ink display device by controlling the electric field.

Whatever has to be noticed is there are two thin film transistors 216a, 216b and two corresponding scan line 212a, 212b in every pixel area 210a. Once if the two scan lines 212a, 212b or the two thin film transistors 216a, 216b are damaged, repairing technique such as laser cutting or laser welding can be used to fix the problem. Furthermore, if any of the two sets (thin film transistor 216a and scan line 212a or thin film transistor 216a and scan line 212a) is damaged, pixel still function normally without applying any conventional repairing to achieve automatic recovery results.

In addition, in order to obtain more efficient repairing, a connecting line 219 connected to the first scan line 212a and the second scan line 212b is formed in every pixel area 210b in this embodiment. Once if any of the scan lines 212a, 212b is broken, the scan line 212a and 212b of the next pixel can still receive driving signal.

Figure 4:
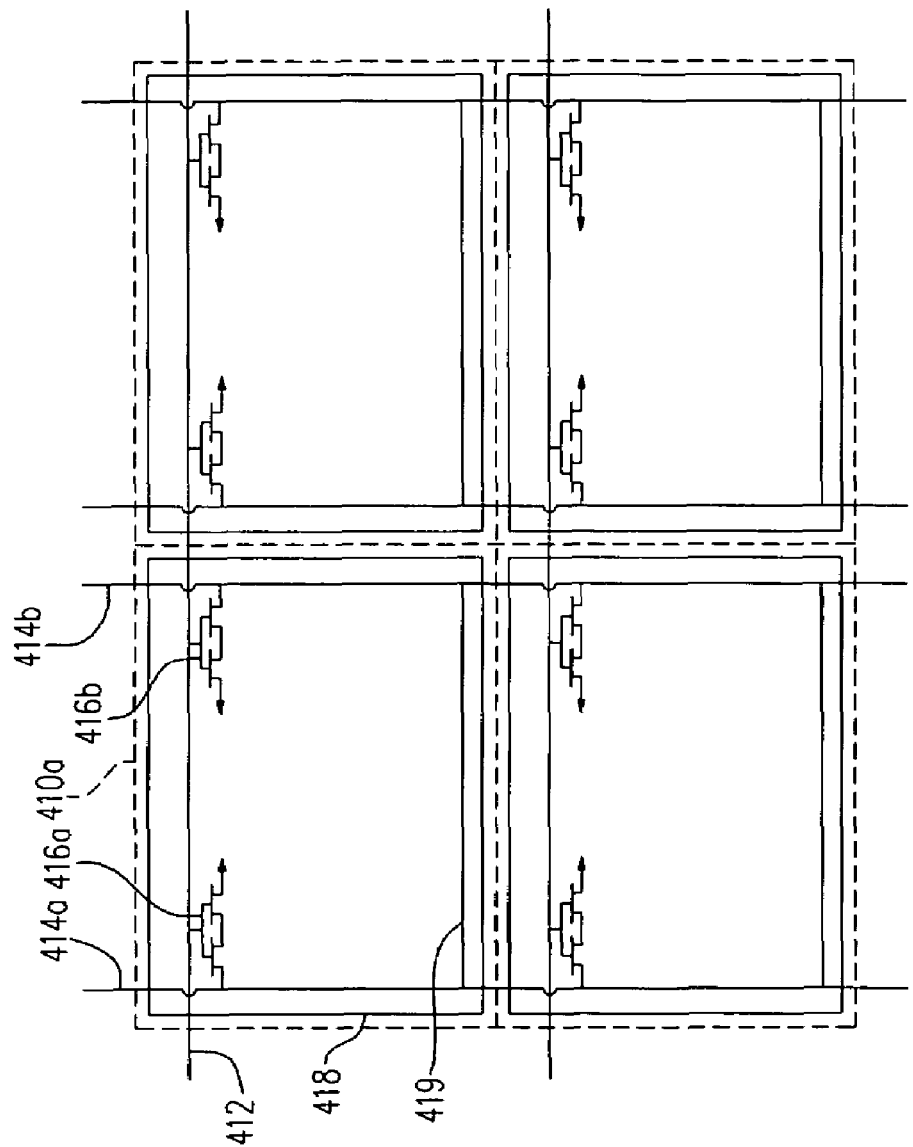
FIG. 4 is a layout of thin film transistor array substrate of this invention, according to another preferred embodiment of this invention.

In addition to the preferred embodiment mentioned above. More than two data lines can be formed in one pixel area. Different thin film transistors are connected to different data lines. FIG. 4 is a layout of thin film transistor array substrate of this invention, according to another preferred embodiment of this invention. Structures similar to previously disclosed embodiment is not discussed again.

Referring is made to FIG. 4, in this preferred embodiment, every pixel area 410a is passed through by, for example, a scan line 412, a first data line 414a and a second data line 314b. A first thin film transistor 416a and a second thin film transistor 416b are formed in every pixel area 410a. The first thin film transistor 416a and the second thin film transistor 416b are both activated by the scan line 412. Similarly, the first thin film transistor 416a and the second thin film transistor 416b can be dual gate thin film transistor or other types of thin film transistors.

As illustrated in FIG. 4, a pixel electrode 418 connected to the first thin film transistor 416a and the second thin film transistor 416b is formed in every pixel area 410a. The pixel area 410a is completely covered by the pixel electrode 418. The pixel electrode can be made of transparent conducting material or metallic material such as indium tin oxide (ITO) and indium zinc (IZO). When the thin film transistor array substrate is in operation, driving signal is transmitted to the scan line 412 to activate the first thin film transistor 416a and the second thin film transistor 416b, respectively. A displaying voltage from the first data line 414a or/and the second data line 414b is input into the pixel electrodes 418 through the first thin film transistor 416a or/and the second thin film transistor 416b, respectively.

According to the preferred embodiment, the defects on the thin film transistors 416a, 416b and/or data lines 414a, 414b may be repaired by conventional repairing technique or may be automatically recovered. Furthermore, the first data line 414a and the second data line 414b in every pixel area 410a can be connected by a connecting line 419 to improve reliability of the thin film transistor array substrate.

Figure 5:
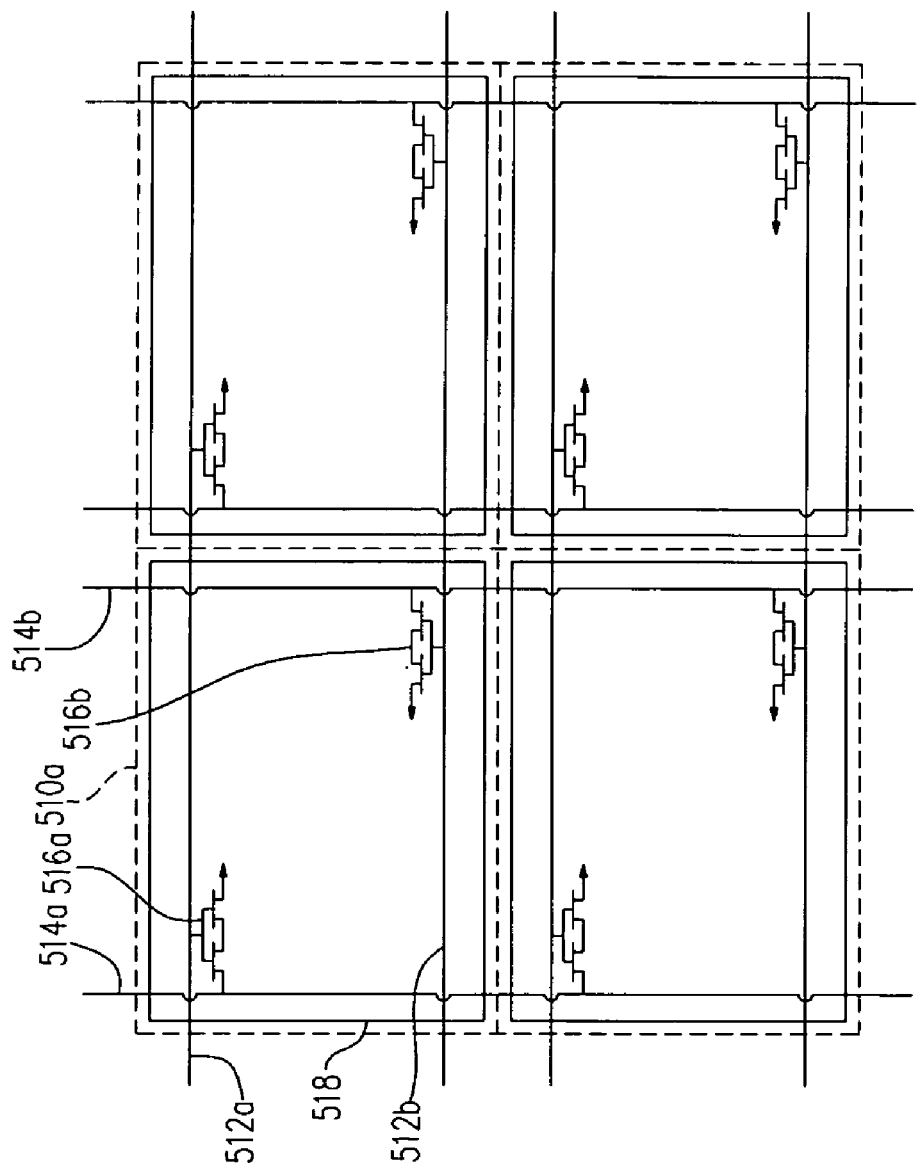
FIG. 5 is a layout of thin film transistor array substrate of this invention, according to another preferred embodiment of this invention.

FIG. 5 is a layout of thin film transistor array substrate of this invention, according to another preferred embodiment of this invention, more than two scan lines and more than two data lines are formed on the same pixel area in the preferred embodiment in order to repair any possible defect on the scan line, data line and thin film transistor. As illustrated in FIG. 5, each pixel area 510a comprises a first thin film transistor 516a, a second thin film transistor 516b, a first scan line 512a, a second scan line 512b, a first data line 514a and a second data line 514b. The first thin film transistor 516a is activated by the first scan line 512a and the second thin film transistor 516b is activated by the second scan line 512b. Furthermore, the first thin film transistor 516a and the second thin film transistor 516b can be, for example, dual gate thin film transistor or other types of thin film transistors.

Please refer to FIG. 5, a pixel electrode 518 connected to the first thin film transistor 516a and the second thin film transistor 516b. The pixel area 510a is completely covered by the pixel electrode 518. The pixel electrode can be made of transparent conducting material or metallic material such as indium tin oxide (ITO) and indium zinc (IZO). When the thin film transistor array substrate is in operation, same driving signal is transmitted from the first scan line 512a and the second scan line 512b to activate the first thin film transistor 516a and the second thin film transistor 516b, respectively. A displaying voltage from the first data line 514a and/or the second data line 514b is input into the pixel electrode 518 through the first thin film transistor 516a and/or the second thin film transistor 516b.

Similarly, connecting line (not illustrated in FIG. 5) can also be formed on the pixel area 510a to connect scan lines 512a, 512b or data line 514a, 514b in this preferred embodiment. According to the preferred embodiment of the thin film transistor array substrate in this invention, the defects on the thin film transistors 516a, 516b, scan lines 512a, 512b and/or data lines 514a, 514b may be repaired by conventional repairing technique or may be automatically recovered.

Whatever has to be noticed is that two sets of thin film transistors, scan lines or data lines are used to illustrate above preferred embodiments of this invention. It will be apparent to those skilled in the art that various modifications and variations can be made to the number and arrangement of transistors, scan lines, data lines, connecting lines in order to reach the best layout.

Figure 6:
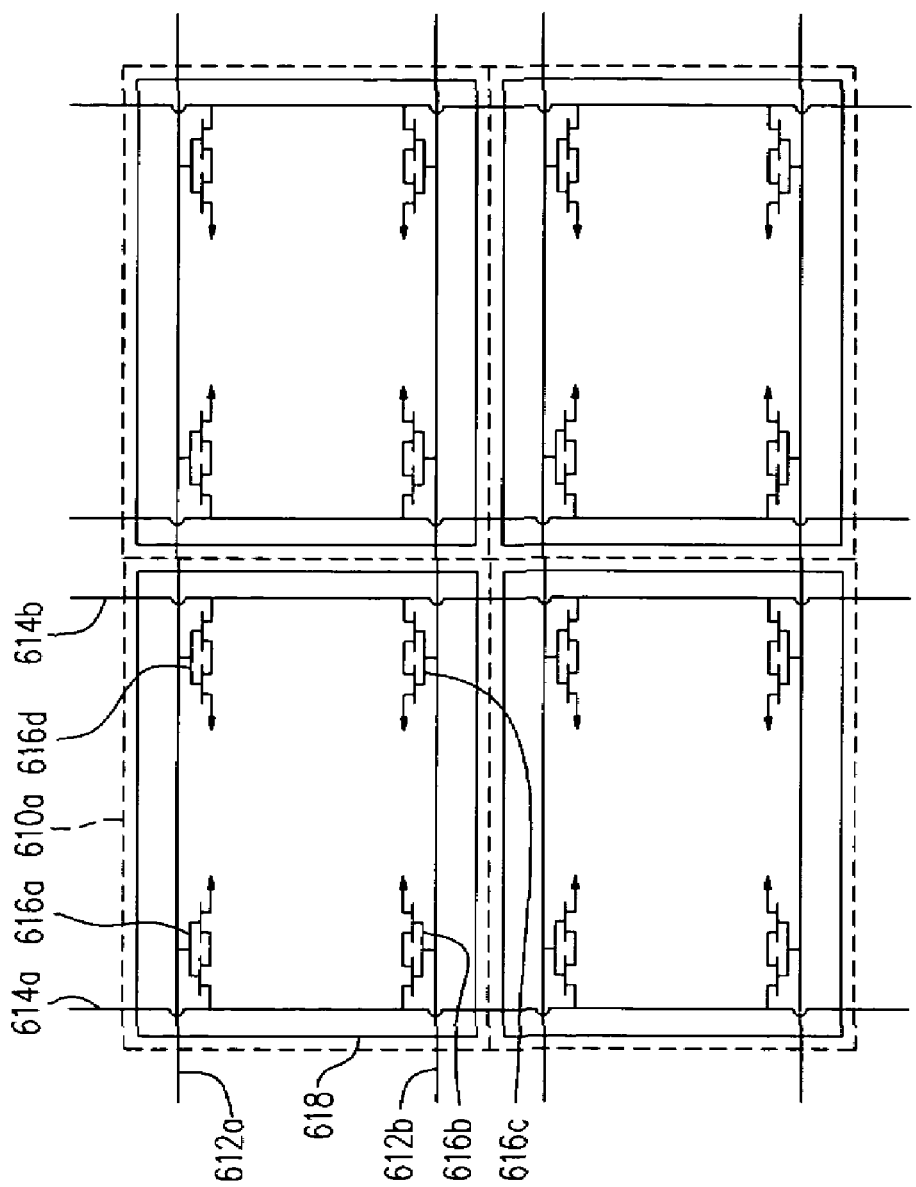
FIG. 6 is a layout of thin film transistor array substrate of this invention, according to another preferred embodiment of this invention.

For instance, this invention can be a layout of thin film transistor array substrate illustrated in FIG. 6. Four thin film transistors accompanied by two scan lines and two data lines can be formed on one pixel area to repair any possible defect on the scan lines, data lines and thin film transistors. As illustrated in FIG. 6, every pixel area 610a comprises a first thin film transistor 616a, a second thin film transistor 616b, a third thin film transistor 616c, a forth thin film transistor 616d, a first scan line 612a, a second scan line 612b, a first data line 614a and a second data line 614b. The first thin film transistor 616a and the forth thin film transistor 616d are activated by the first scan line 612a, the second thin film transistor 616b and the third thin film transistor 616c are activated by the second scan line 612b. In addition, thin film transistors 616a~616d can be dual gate thin film transistor or other types of thin film transistors.

Please refer to FIG. 6, a pixel electrode 618 connected to the thin film transistors 616a~616d, the pixel area 610a may be completely covered by the pixel electrode 618. The pixel electrode can be made of transparent conducting material or metallic material such as indium tin oxide (ITO) and indium zinc (IZO). When the thin film transistor array substrate is in operation, same driving signal is transmitted from scan lines 612a and 612b to activate the thin film transistors 616a~606d, respectively. A displaying voltage from the data lines 614a and/or 614b is input into the pixel electrode 618 through the thin film transistors 616a, 616b and/or 616c, 606d. Similarly, connecting line (not illustrated in FIG. 5) can also be formed on the pixel area 610a to connect scan lines 612a, 612b or data line 614a, 614b in this preferred embodiment.

Accordingly, the thin film transistor of this invention has featuring characteristics and advantages:

1. Several thin film transistors, scan lines and data lines are formed in one pixel area. The repairing technique can be used to repair the defect or the defect can be automatically recovered once if any defect is found, so the yield rate can be improved.

2. Several scan lines and data lines in the same pixel can be connected to improve reliability.

3. The pixel area is completely covered by the pixel electrode, so the aperture ratio of the pixel will not be influenced by the number of thin film transistors or circuits underneath the electrode. Even the repairing technique can be applied to obtain better displaying quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor array substrate used in an E-ink display device, comprising:
   a substrate, comprising a plurality of pixel areas;
   a plurality of scan lines and data lines formed on the substrate;
   a plurality of thin film transistors, wherein four thin film transistors corresponding to two scan lines and two data lines are formed in every pixel area, each of the thin film transistors only corresponds to one scan line and one data line, each of the scan line and each of the data line are corresponded to, at least, one of the thin film transistors; and
   a plurality of pixel electrodes, one pixel electrode is formed in one pixel area, the pixel electrode covers and connects to the thin film transistor in the same pixel area.

2. The thin film transistor array substrate of claim 1, wherein the pixel area contains, at least, two thin film transistors corresponding to two scan lines.

3. The thin film transistor array substrate of claim 2, wherein a plurality of connecting lines are formed in the pixel area to connect scan lines in the same pixel area.

4. The thin film transistor array substrate of claim 1, wherein each pixel area contains, at least, two thin film transistors corresponding to two scan lines are formed in every pixel area.

5. The thin film transistor array substrate of claim 4, wherein each pixel area contains two scan lines.

6. The thin film transistor array substrate of claim 4, wherein a plurality of connecting lines are formed in the pixel areas to connect the data lines in the same pixel area.

7. The thin film transistor array substrate of claim 1, wherein a plurality of connecting lines formed in the pixel areas to connect scan lines or data lines in the same pixel area.

8. An E-ink display device, comprising:
   a thin film transistor array substrate, comprising:
      a substrate with a plurality of pixel areas;
      a plurality of scan lines and a plurality of data lines formed on the substrate;
      a plurality of thin film transistors, wherein four thin film transistors corresponding to two scan lines and two data lines are formed in every pixel area, each of the thin film transistors only corresponds to one scan line and one data line, each of the scan line and each of the data line are corresponded to, at least, one of the thin film transistors;
      a plurality of pixel electrodes, one pixel electrode is formed in the pixel area, the pixel electrode covers and connects to the thin film transistor in the same pixel area;

an E-ink material layer formed on the pixel electrodes of the E-ink transistor array substrate;

a transparent cover formed on the E-ink material layer; and a transparent electrode layer formed between the transparent cover and the E-ink material layer.

9. The E-ink display device of claim 8, wherein the pixel area contains, at least, two thin film transistors corresponding to two scan lines.

10. The E-ink display device of claim 9, wherein a plurality of connecting lines are formed in the pixel area to connect scan lines in the same pixel area.

11. The E-ink display device of claim 8, wherein each pixel area contains, at least, two thin film transistors corresponding to two scan lines are formed in every pixel area.

12. The E-ink display device of claim 11, wherein each pixel area contains two scan lines.

13. The E-ink display device of claim 11, wherein a plurality of connecting lines are formed in the pixel areas to connect the data lines in the same pixel area.

14. The thin film transistor array substrate of claim 8, wherein a plurality of connecting lines formed in the pixel areas to connect scan lines or data lines in the same pixel area.

* * * * *